United States Patent [19]
Adiletta

[11] Patent Number: 5,954,962
[45] Date of Patent: Sep. 21, 1999

[54] FIBROUS NONWOVEN WEB

[75] Inventor: Joseph G. Adiletta, Thompson, Conn.

[73] Assignee: Pall Corporation, East Hills, N.Y.

[21] Appl. No.: 08/945,736

[22] PCT Filed: Jun. 19, 1996

[86] PCT No.: PCT/US96/10564

§ 371 Date: Oct. 28, 1997

§ 102(e) Date: Oct. 28, 1997

[87] PCT Pub. No.: WO97/00347

PCT Pub. Date: Jan. 3, 1997

Related U.S. Application Data

[63] Continuation-in-part of application No. 08/492,420, Jun. 19, 1995, Pat. No. 5,709,798.

[51] Int. Cl.⁶ ............................................. B01D 29/00
[52] U.S. Cl. ............. 210/490; 210/500.27; 210/500.29; 210/500.38; 210/321.6; 210/506; 210/508; 210/509; 428/357; 428/395; 428/338; 2/1
[58] Field of Search ................................ 210/651, 652, 210/654, 500.38, 506, 508, 509, 490, 500.27, 321.6, 500.29; 428/357, 355, 338; 2/1

[56] References Cited

U.S. PATENT DOCUMENTS

| | | | |
|---|---|---|---|
| 3,242,035 | 3/1966 | White | 428/374 |
| 3,756,908 | 9/1973 | Gross | 162/146 |
| 4,340,479 | 7/1982 | Pall | 210/490 |
| 4,369,156 | 1/1983 | Mathes et al. | 264/147 |
| 4,523,995 | 6/1985 | Pall et al. | 210/504 |
| 4,524,103 | 6/1985 | Seager | 428/338 |
| 4,650,506 | 3/1987 | Barris et al. | 55/487 |
| 5,246,776 | 9/1993 | Meraldi et al. | 428/364 |
| 5,290,446 | 3/1994 | Degen et al. | 210/446 |
| 5,529,844 | 6/1996 | Degen et al. | 428/357 |
| 5,709,798 | 1/1998 | Adiletta | 210/651 |

FOREIGN PATENT DOCUMENTS

| | | |
|---|---|---|
| 0 083 489 | 7/1983 | European Pat. Off. . |
| 0 109 169 | 5/1984 | European Pat. Off. . |
| 0 402 866 | 12/1990 | European Pat. Off. . |
| 0 475 708 | 3/1992 | European Pat. Off. . |
| 891945 | 3/1962 | United Kingdom . |
| 2 288 825 | 1/1995 | United Kingdom . |

OTHER PUBLICATIONS

"The Kady Mill" Brochure (Kinetic Dispersion Corp., Scarborough, Maine).

"HTD28 Homogenizer" Brochure (Union Pump Company, North Andover, Massachusetts).

"M–110Y High Pressure Microfluidizer® Processor" Technical Bulletin (Microfluidics International Corporation, Newton, Massachusetts).

"M–110EH Electric–Hydraulic Laboratory Microfluidizer®" (Microfluidics International Corporation, Newton, Massachusetts).

"Microfluidizer® Processing Equipment" Product Catalog (Microfluidics International Corporation, Newton, Massachusetts).

"Standard Test Methods for Pore Size Characteristics Of Membrane Filters By Bubble Point And Mean Flow Pore Test", *American Society For Testing & Materials* F316–86 (Apr. 1986).

WPI Accession No. 85–220757/36, Derwent Publications Ltd. abstract (JP 60–142860 Jul. 29, 1985).

*Primary Examiner*—Ana Fortuna
*Attorney, Agent, or Firm*—Leydig, Voit & Mayer, Ltd.

[57] ABSTRACT

The present invention provides a polymeric nonwoven web having a relatively small pore size, and made from mixtures of aramid and other non-aramid fibers. The fibrous nonwoven web has a high titer reduction with respect to coliphage PR772. The present invention provides the filter element incorporating the present inventive fibrous nonwoven web. The nonwoven web is also adapted to be use as human apparel and fashioned into garments.

32 Claims, 2 Drawing Sheets

FIBROUS NONWOVEN WEB

CROSS-REFERENCE TO RELATED APPLICATION

This application is a 371 of PCT/US96/10564 filed Jun. 19, 1996 and a continuation-in-part of U.S. patent application Ser. No. 08/492,420, filed Jun. 19, 1995, now U.S. Pat. No. 5,709,798.

TECHNICAL FIELD OF THE INVENTION

The present invention pertains to a fibrous nonwoven web. In particular, the present invention relates to a polymeric fiber sheet, especially an aramid fiber sheet, as well as a method of preparing and using such a sheet, particularly as a filtration medium.

BACKGROUND OF THE INVENTION

Numerous fibrous filtration sheets have been prepared from a variety of fibers, such as glass, polyethylene, polypropylene, polyester, and aramid fibers. While these sheets are suitable for many applications, particularly many filtration applications, they are generally incapable of reliably removing small micron and submicron particulate matter and bacteria and viruses. While the thickness of such a fibrous sheet can be increased to compensate for the relatively large pore size of the sheet, the flow resistance of the sheet then becomes impracticably high. This inability to prepare fibrous filtration sheets of sufficiently small pore size is generally the result of the unavailability of fibers of sufficiently fine diameter, inasmuch as the pore size of a fibrous filtration sheet is related to some extent to the fiber diameter used to prepare such a sheet, i.e., uniformly smaller diameter fibers will more easily allow for the preparation of a fibrous filtration sheet of uniformly smaller pore size.

While membranes, such as microporous and ultrafiltration membranes, are capable of providing the desirable smaller pore size as compared to fibrous nonwoven webs, membranes suffer from many performance disadvantages as compared to fibrous nonwoven webs. For example, membranes are relatively brittle and require considerable care in handling. As a result, membranes are difficult to convert into corrugated structures for filter elements without introducing cracks in the membranes, particularly in preparing small radii filter elements, with the consequent loss of filtration efficiency. The relative fragility of membranes also render membranes susceptible to failure upon pulsing of the fluid flow through the membranes.

Accordingly, there remains a need for a fibrous nonwoven web with a relatively small pore size, preferably sufficiently small to remove submicron particles, especially bacteria and viruses, at a reasonable thickness and/or flow resistance through the fibrous nonwoven web. Such a fibrous nonwoven web preferably also would have a high modulus, as well as sufficient elongation, so as to withstand filtration conditions, such as pulsing, which can be encountered in commercial filtration processes. The handling characteristics of such a fibrous nonwoven web also should be such that the fibrous nonwoven web can be converted into a corrugated structure for a filter element without damaging the web in any way so as to affect filtration efficiency. A high temperature resistance and good chemical stability are other useful and desirable characteristics of such a fibrous nonwoven web.

The present invention provides such a fibrous nonwoven web, as well as a method of preparing and of using such a fibrous nonwoven web, particularly in filtration applications. These and other objects and advantages of the present invention, as well as additional inventive features, will be apparent from the description of the invention provided herein.

BRIEF SUMMARY OF THE INVENTION

The present invention provides a fibrous nonwoven web useful as a filtration medium. The present inventive fibrous nonwoven web is characterized by having a titer reduction of at least about $10^6$, preferably at least about $10^8$, and most preferably at least about $10^{10}$, with respect to *Pseudomonas diminuta*, and a titer reduction of at least about $10^1$, preferably at least about $10^3$, more preferably at least about $10^5$, and most preferably at least about $10^8$, or even at least about $10^{10}$, with respect to PR772 coliphage, and an air flow resistance of about 30 psi (about 200 kPa) or less at a thickness of about 0.02 inch (about 500 µm) or less. Accordingly, the present inventive fibrous nonwoven web can be prepared so as to be capable of removing all bacteria and a significant portion of, and preferably all, viruses from a fluid. The present invention further provides a method of filtering a fluid by passing a fluid through the present inventive fibrous nonwoven web.

DESCRIPTION OF THE PREFERRED EMBODIMENTS

The present invention provides a fibrous nonwoven web with the pore size, e.g., microporosity, advantages of a membrane and the handling advantages of a fibrous nonwoven web such as ruggedness, extended life, filter depth, and strength, with few of the disadvantages of either of those filtration media. While membranes, e.g., microporous and ultrafiltration membranes, can be prepared which are capable of having submicron pore ratings which could be used to exclude, for example, the smallest bacteria and viruses, such membranes suffer from the significant disadvantage of being quite fragile. In many situations requiring more rugged filtration media, fibrous nonwoven webs are utilized; however, such fibrous nonwoven webs are generally limited to the filtration of relatively larger particles from fluids and are not typically suitable for removing submicron particles such as bacteria and viruses from fluids. The present inventive fibrous nonwoven web provides a combination of the advantages of conventional membrane and fibrous nonwoven web filtration media.

In particular, the present invention provides a fibrous nonwoven web characterized by a titer reduction of at least about $10^6$, preferably at least about $10^8$, and most preferably at least about $10^{10}$, with respect to *Pseudomonas diminuta*. Since *Pseudomonas diminuta* is generally accepted as the smallest and highest penetrating test bacteria, its retention by a material is evidence of the material's ability to provide absolute removal of bacteria, particularly liquid-borne bacteria, in most applications. Thus, the present invention is generally capable of the absolute removal of bacteria from fluids under most conditions.

Similarly, the present inventive fibrous nonwoven web can be further characterized by a titer reduction of at least about $10^1$, preferably at least about $10^3$, more preferably at least about $10^5$, and most preferably at least about $10^8$, or even at least about $10^{10}$, with respect to PR772 coliphage. While viruses are not all of the same size, viruses are typically characterized as either "large" viruses or "small" viruses. The large viruses include viruses of about 0.08 µm in effective diameter and larger, e.g., adenoviruses, rheoviruses, and herpes viruses. The small viruses include viruses which are about 0.025–0.028 µm in effective diameter, e.g., hepatitis viruses, polio viruses, and parvoviruses. Inasmuch as the size of the PR772 coliphage is about 0.053 µm, and the size of the PP7 bacteriophage is about 0.027 µm, these phages provide excellent models for assessing the removal efficiency of a filtration medium with regard to various sized viruses. A filtration medium is generally considered to have an absolute removal ability with respect to a particular particle, e.g., the PR772 coliphage as representative of intermediate-sized viruses, when it has at least a $10^8$, and preferably at least a $10^{10}$, titer reduction with respect to that particle. Of course, an absolute removal ability of a filtration medium with respect to the PR772 or PP7 phages would confirm the absolute removal ability of that filtration medium with respect to larger viruses.

The titer reduction of a filtration medium with respect to a particular particle, e.g., PR772 coliphage, is the ratio of that particle contained in the influent to that contained in the effluent. Surprisingly, the aforesaid titer reduction is capable of being achieved by the present inventive fibrous nonwoven web at a reasonable thickness and flow resistance. In particular, the aforesaid titer reductions preferably can be achieved with the present inventive fibrous nonwoven web having a thickness of about 0.02 inch (about 500 µm) or less, more preferably a thickness of about 0.01 inch (about 250 µm) or less, and most preferably a thickness of about 0.008 inch (about 200 µm) or less, e.g., about 0.001–0.006 inch (about 25–150 µm). The present inventive fibrous nonwoven web desirably has an air flow resistance of about 30 psi (about 200 kPa) or less, preferably about 20 psi (about 140 kPa) or less, more preferably about 15 psi (about 100 kPa) or less, and most preferably about 7 psi (about 50 kPa) or less, e.g., about 1.5–6 psi (about 10–40 kPa). All of the air flow resistance (i.e., pressure drop or ΔP) values set forth herein to describe and illustrate the present invention reflect values determined using an air flow rate of 28 ft/min (about 8.5 m/min) in accordance with the general procedure described in U.S. Pat. No. 4,340,479.

The present inventive fibrous nonwoven web can have any suitable sheet (or basis) weight. The desirable sheet weight of the present inventive fibrous nonwoven web will vary depending on the particular application for the fibrous nonwoven web. In many applications, the present inventive fibrous nonwoven web generally will have a sheet weight no more than about 80 g/m² and desirably will have a sheet weight of no more than about 60 g/m², preferably no more than about 40 g/m². While the present inventive fibrous nonwoven web can have a sheet weight of less than about 10 g/m², such a filtration fibrous nonwoven web will typically have a sheet weight of at least about 20 g/m², e.g., 20–40 g/m².

Generally, the present inventive fibrous nonwoven web will have as low a sheet weight as possible as consistent with application objectives. A lower sheet weight typically will result in a lower flow resistance and a thinner fibrous nonwoven web, which in turn reduces material costs and enables the easier manipulation of the fibrous nonwoven web, particularly the easier corrugation of the fibrous nonwoven web without damage for use in a filter cartridge. Further, this will provide higher filter surface area with respect to a particular volume and longer service life. Surprisingly, the desirable properties of the present inventive fibrous nonwoven web, including consistent and predictable removal efficiencies, are attainable at very low sheet weights, e.g., to as low as 20 g/m² and below.

The present invention also provides a method of preparing the fibers which are useful in the construction of the present inventive fibrous nonwoven web. Specifically, the present invention includes a method of reducing the diameter, and preferably length, of fibers comprising preparing a dispersion of fibers in a fluid and subjecting the dispersion to fibrillation, particularly mechanical fibrillation, under conditions sufficient to reduce the average diameter, and preferably length, of the fibers. The present invention also includes a method of preparing a fibrous nonwoven web comprising reducing the diameter, and preferably length, of fibers as described herein and preparing a fibrous nonwoven web from the thus processed fibers.

Such fibers can include any suitable fibers, preferably polymeric fibers. Suitable fibers include aramid, titinate, polyester, asbestos, and cellulosic fibers (particularly esparto fibers). While the present inventive fibrous nonwoven web can comprise any of such fibers or combinations thereof, with or without other fibers, e.g., glass fibers, cotton fibers, or other materials, the present inventive fibrous nonwoven web preferably consists essentially of such fibers alone. Such fibers most preferably are aramid fibers, which are fibers of poly(paraphenylene terephthalamide) and related compounds wherein the majority of the amide groups are directly attached to two aromatic rings. Aramid fibers are commercially available as Kevlar® fibers (duPont, Wilmington, Del.), Twaron® fibers (Akzo, Arnhem, Netherlands), Apyeil® fibers (Unitika, Osaka, Japan), and Conex® fibers (Teijin, Osaka, Japan). While any suitable aramid fibers may be used in conjunction with the present invention, Kevlar® 361 and Twaron® 1094 aramid fibers are preferably utilized for purposes of the present invention.

Although it is preferred to use aramid fibers alone, a composite web may be prepared with aramid fibers and other fibers, such as, for example, polyester fibers, cotton fibers, glass fibers, cellulose fibers, such as esparto, or other polymeric fibers, or combinations among the foregoing fibers. Polyester fibers may be added, for example, to increase the strength of the web or to vary the pore rating of the web. Examples of suitable polyester fibers include Reemay® fibers (20 µm diameter fibers, Reemay, Old Hickory, Tenn.), polyethylene terephthalate (PET) fibers, polybutylene terephthalate (PBT) fibers, poly(1,4-cyclohexylene dimethylene terephthalate), and so forth. The choice of a particular polyester will depend on the application to which the web will be put. The fibers can be incorporated into the aramid web in any suitable amount, typically in an amount from about 5% to about 50% by weight. A composite polyester-aramid fiber web thus prepared can be used in a number of applications, for example, for removing residue from rollers in a photocopy machine.

Cotton fibers, such as those sold by Barnhardt Co., or glass fibers, such as those sold under the trade name Evanite by Evans Co., can be added to increase the dirt capacity of the aramid fiber web when the web is used as a filter. Such cotton or glass fibers can be incorporated into the aramid web in any suitable amount, typically in an amount from about 5% to about 60% by weight. Other fibers can be incorporated into the web, for example, carbon, steel, aluminum, and so forth.

In accordance with one embodiment of the invention, the fibrous web includes cellulose fibers. The cellulose fibers can form a composite web with aramid fibers, or, optionally, the web may be prepared with cellulose fibers alone. When a composite web is prepared with aramid fibers and cellulose fibers, the aramid fibers preferably are present in an amount ranging from about 40% to about 95% by weight. The preferred cellulose fibers for use in the present invention are esparto fibers, such as those sold by Morgan Co. A cellulose fiber web in accordance with the invention is particularly suitable for use as a filter press pad, for example, for filtering comestible liquids such as beverage syrups. The cellulose fibers can form composite webs with other fibers, such as, for example, polyester fibers, glass fibers, cotton fibers, and so forth.

Such composite webs can be prepared in accordance with the teachings set forth above. For example, a dispersion containing the fibers can be subjected to fibrillation, such as mechanical fibrillation, and a nonwoven web subsequently prepared therefrom. When a composite fibrous web is being prepared, the dispersion of fibers preferably corresponds to the percentage of fibers desired in the composite web. For example, if a composite web comprising 25% aramid fibers and 75% cellulose fibers is desired, the initial dispersion subject to fibrillation desirably contains this ratio of fibers.

The fibers useful in the context of the present invention can be of any suitable length and typically will be cut fibers of about 4 mm or less in length. In general, shorter length fibers, such as fibers having lengths of about 2 mm or less, desirably are used in connection with the present invention. The use of shorter length fibers can result in a decrease or avoidance of undesirable entanglements during the preparation of the present inventive fibrous nonwoven web and can lead to the preparation of a thinner and more uniform fibrous nonwoven web with reduced flow resistance while retaining the desirable properties of the present inventive fibrous nonwoven web.

The reduction of the diameter of the fibers can be carried out by subjecting any suitable dispersion of the fibers, e.g., aqueous dispersions of about 50 g/l or less, to any suitable fibrillation means under conditions sufficient to reduce the average diameter of the fibers. It has been discovered that more concentrated fiber dispersions can be beneficial in achieving greater fibrillation, i.e., greater diameter reduction, of the fibers. Thus, the fibrillation in the context of the present invention is preferably carried out with fiber dispersions of at least about 20 g/l, e.g., about 25–40 g/l. Such fibrillation can be carried out by any suitable device, such as a mill mixer, particularly a Kady Mill® mixer (Kinetic Dispersion Corp., Scarborough, Me.), for a sufficient period of time, a homogenizer, particularly a Union® HTD28 Homogenizer (Union Pump Co., North Andover, Mass.), for a sufficient number of passes, or a microfluidizer, particularly a Microfluidizer Model M110Y or M110EH (Microfluidics International Corp., Newton, Mass.), for a sufficient number of passes.

It has been found that the processing time in conjunction with the fibers solids and fibrillation energy, e.g., mechanical energy, is directly related to the filtration efficiency of the resulting fibrous nonwoven web prepared from the processed fibers. Thus, for example, it is possible to provide a fibrous nonwoven web with a consistent and predictable titer reduction by controlling the processing time of the fibers in a given piece of equipment under constant operating conditions. It has been observed that extending the time of processing will better separate the fibers, and will shorten the length to diameter ratios of the fibers. The pore rating of the web produced with such fibers will decrease, and the pressure drop across the web will increase when the web is used as a filter.

The use of a mill mixer to treat fibers in the context of the present invention is preferred inasmuch as such equipment provides for fibers with smaller diameters and, thus, fibrous nonwoven webs with smaller pores. Such equipment preferably is operated at maximum recommended operating conditions to achieve the smallest diameter fibers and smallest pore rated fibrous nonwoven webs in the least amount of processing time.

The mechanical fibrillation in the context of the present invention is quite different than the mixing which typically takes place in conventional Fourdrinier paper making processes which utilize relatively low-energy beaters such as the Jordan®, Cowles®, and Claflin® beaters. Such relatively low-energy mixers, however, may be used to prepare an initial dispersion of the raw fibers prior to subjecting the dispersion to the mechanical fibrillation in accordance with the present invention. For example, a raw fiber dispersion may be prepared by such a relatively low-energy beater until a satisfactory dispersion is reached, e.g., no lumps are readily apparent in the dispersion, which point typically will be reached within an hour or two. This dispersion then may be diluted as desired before being subjected to the fibrillation process in accordance with the present invention as described above. The present invention accordingly provides fiber which is capable of being formed into the present inventive fibrous nonwoven web.

Surprisingly, the present invention is capable of reducing the diameter of fibers without substantially adversely affecting other, desirable characteristics of the fibers, including the modulus, elongation, temperature resistance, and chemical stability of such fibers. Thus, fibrous nonwoven webs prepared from the thus processed fibers retain the desirable properties of conventional fibrous nonwoven webs while also exhibiting improved pore size and pore size distribution characteristics akin to those of membranes.

The present inventive fibrous nonwoven web can be prepared from such processed fibers by fibrous sheet techniques which are well-known in the art, such as conventionally modified Fourdrinier paper making processes. While a binder resin is generally not necessary to provide structural integrity to the fibrous nonwoven web (surprisingly, it is believed that the fibers' natural surface charge holds the fibers together), a binder resin nevertheless can be used in preparing the present inventive fibrous nonwoven web so as to improve the mechanical properties, particularly the tensile properties, of the fibrous nonwoven web. Any suitable binder resin can be utilized in the context of the present invention. Suitable binder resins include epoxy binders, for example, EPON 826 or EPI-REZ (Shell Corporation), binders which would impart a positive zeta potential to the fibrous nonwoven web, acrylic binders, tetrafluoroethylene binders, fluorinated ethylene propylene (FEP) binders, ethylene vinyl acetate (EVA), phenolic resin binders, and fluoroethylene polymer binders, or combinations among the foregoing, such as, for example, phenolic and epoxy binders. The binder resin can be utilized with the present inventive fibrous nonwoven web by use of a variety of techniques, which are well-known in the art. For example, the fibrous nonwoven web can be passed through an appropriate resin solution, dried, and then cured. Alternatively, an appropriate binder resin can be exhausted onto the fibers in slurry form preparatory to a Fourdrinier operation to convert the fibrous slurry into a fibrous nonwoven web. Additional methods of binder application include spraying, pattern printing, and powder resin coating.

Although a binder is not necessary, a binder preferably is used when additional strength is desired. Thus, for example, a binder preferably is used when the fibrous web is used to process fluids at relatively high pressures, for example, pressures exceeding about 200 psig (about 1380 kPa). A binder further preferably is used when the filter is designed to be backwashed. The choice of binders for the present inventive fibrous nonwoven web may be based upon the particular application to which the web will be put, and may be based upon factors including the temperature and chemical composition of the filtered fluid. For example, FEP is a preferred binder when the web is used at temperatures of about 225° C. to about 270° C. At higher temperatures, such as temperatures ranging from about 550° C. to about 600° C., a polytetrafluoroethylene (PTFE) binder is preferred. PTFE binders are advantageous in that they render the fibrous web chemically inert to many chemically aggressive environments. The PTFE binders also render the surface of the fibrous web hydrophobic, and thus particularly suitable for filtering certain media. For lower temperature applications, epoxy binders, such as EPON 826 (Shell Corporation), may be used.

A binder that changes the zeta potential of the fibrous web can be used to ionically enhance the filtration properties of the nonwoven web. For example, the surface of the nonwoven web can be modified with a surface-modifying binder to impart a charge to the surface of the nonwoven web. Suitable surface modifying binders include, for example, cationic polymers. One such cationic polymer is a polyamine resin sold under the trademark KYMENE by Hercules Co. Such a positively-charged, surface-modified fibrous web is especially well suited for the filtration of negatively charged species.

The present inventive fibrous nonwoven web also can be surface modified to, for example, modify the wetting properties, e.g., critical wetting surface tension (CWST), of the fibrous nonwoven web (e.g., to render it hydrophobic, hydrophilic, oleophobic, or oleophilic). The measurement of CWST is disclosed in U.S. Pat. No. 4,880,548. Such surface modification of the present inventive fibrous nonwoven web can be carried out in any suitable manner and preferably is accomplished by graft polymerizing a suitable monomer onto the surface of the fibrous nonwoven web. Preferred examples of such monomers include acrylic or methacrylic monomers having alcohol functional groups, such as, for example, hydroxyethylacrylate, hydroxyethylmethacrylate, hydroxypropylacrylate, hydroxypropylmethacrylate, and combinations thereof, particularly hydroxypropylacrylate and/or hydroxyethylmethacrylate. These monomers can be combined with small amounts of acrylic monomers having no alcohol functional groups, such as methyl methacrylate, as described in U.S. Pat. No. 5,019,260.

Any suitable means may be used to polymerize the suitable monomers onto the fibrous nonwoven web of the present invention. Radiation grafting is the preferred technique to achieve such a result. The source of radiation can be from radioactive isotopes like Cobalt 60, Strontium 90, and Cesium 137, or from machines like x-ray machines, electron accelerators, and ultraviolet equipment. Preferably, however, the radiation is in the form of electron beam radiation. It has been found that, by using this form of radiation, a very uniform distribution of radiation can be provided. This in turn results in a final product which is grafted more uniformly as compared to those fibrous nonwoven webs which are grafted using other radiation sources, e.g., Cobalt 60.

Grafting typically will be achieved by either irradiating the fibrous nonwoven web and then exposing it to a suitable solution of the monomer or irradiating the fibrous nonwoven web while it is exposed to a suitable solution of the monomer. Regardless of which procedure is used, the grafting should be conducted in the absence of oxygen, e.g., under a nitrogen atmosphere, since oxygen will react with the reactive sites created by radiation exposure, thereby lowering the number of sites available for the desired polymer bonding. If the fibrous nonwoven web is irradiated prior to immersion in the monomer solution, the fibrous nonwoven web should contact the monomer solution as quickly as possible to avoid undesirable reactions resulting in the loss of reactive sites for bonding the polymer to the surface of the fibrous nonwoven web.

The monomer solution can comprise any suitable concentration of the monomer to be graft polymerized, typically 1–10 vol. % monomer in a solvent system, generally water by itself or with a suitable alcohol such as t-butyl alcohol. The graft polymerization can be carried out in the presence or absence of crosslinking agents, although crosslinking agents preferably are used when the aforementioned acrylate monomers are graft polymerized onto the surface of the fibrous nonwoven web. Any suitable crosslinking agent can be used in the context of the present invention. Suitable crosslinking agents include di- or poly-acrylates and methacrylates of diols and polyols, particularly linear or branched aliphatic diols such as ethylene glycol, 1,2-propylene glycol, diethylene glycol, dipropylene glycol, dipentylene glycol, polyethylene glycol, polypropylene glycol, polytetramethylene-oxide glycol, and poly(ethylene oxide-copropylene-oxide)glycol, as well as triol acrylates such as trimethylolpropane triacrylate. The crosslinking agent can be utilized in any suitable amount. Typically, the crosslinking agent will be added to the grafting solution in an amount of about 0.025 vol. % to about 5 vol. %, more typically in an amount of about 0.05 vol. % to about 2 vol. %. The details and parameters of polymer grafting are well known in the art.

While the present inventive fibrous nonwoven web is inherently self-supporting at appropriate basis weight, the present inventive fibrous nonwoven web preferably is mated to a suitable support material, e.g., conventional low pressure drop, high strength support layer, particularly when the present inventive fibrous nonwoven web is prepared without added binder resin. The support layer can comprise any suitable porous structure that provides the desired support characteristics while not adversely affecting the desirable properties of the present inventive fibrous nonwoven web, e.g., does not significantly adversely affect flow resistance (ΔP). Suitable materials for the support layer include polymers such as aramid, polyester, polyethylene, polypropylene, and polyamide, as well as glass and cotton. Ideally, the support layer should be compatible with the particular environment, e.g., fluid and operating conditions, within which the present inventive fibrous nonwoven web is intended to operate. Thus, the support layer can be of the same composition as the fibrous nonwoven web, although polyester is generally a desirable support material irrespective of the composition of the fibrous nonwoven web.

In accordance with another embodiment of the invention, a composite filter is formed by laminating a porous membrane, such as a PTFE membrane, to the nonwoven fibrous web of the present invention. Preferably, the nonwoven web of the composite filter comprises aramid fibers, and is prepared without a binder resin. The composite filter is formed by laminating a porous membrane to at least one side, and preferably two opposing sides, of the aramid fiber web. When the composite filter is made with a PTFE membrane, the composite filter will have the surface properties of polytetrafluoroethylene, and, as such, will withstand aggressive chemical and temperature environments. The composite filter will retain the advantage of providing the titer reduction afforded by the aramid fiber web.

Any suitable porous membrane can be used in conjunction with the fibrous nonwoven web of the present invention. Such membranes include those prepared in accordance with U.S. Pat. No. 4,340,479. Many commercially available membranes are suitable for use with the present invention. For example, a PTFE membrane sold under the tradename EMFLON by Pall Corporation may be used. Other suitable membranes include, for example, polyamide and polyethylene membranes. Preferred microporous membranes that may be used in accordance with the present invention include those sold by Pall Corporation under the trademarks Ultipor $N_{66}$®, Fluorodyne®, and Posidyne®; those available from Cuno Corporation under the trademark Zetapor®, and those sold by Millipore under the trademark Durapore®. Preferably, the membrane has a pore size in the range of about 0.1 $\mu$m to about 10 $\mu$m, more preferably about 1 $\mu$m to about 3 $\mu$m. The composite filter can be prepared by laminating the membrane to the fibrous web by any suitable means, such as, for example, by heating and melting the fibers on the surface of the web and affixing the membrane thereto.

The present invention further provides a method of treating, e.g., filtering, a fluid by passing a fluid through the present inventive fibrous nonwoven web. In particular, the filtration of a fluid by passing it through the present inventive fibrous nonwoven web can reduce the quantity of bacteria and preferably viruses in the fluid. Thus, the present inventive filtration method includes passing a fluid through the present inventive fibrous nonwoven web, which fluid contains bacteria, e.g., more than about $10^6$/ml, and even more than about $10^8$/ml, and possibly as much as $10^{10}$/ml or more, before being passed through the fibrous nonwoven web and contains no bacteria after being passed through the fibrous nonwoven web. More preferably, the present inventive method involves passing a fluid through the present inventive fibrous nonwoven web, which fluid contains at least about $10^4$/ml, possibly at least about $10^6$/ml, $10^8$/ml, or even $10^{10}$/ml, viruses before being passed through said fibrous nonwoven web and contains less than about $10^2$/ml viruses after being passed through the fibrous nonwoven web, most preferably wherein the fluid contains no viruses after being passed through the fibrous nonwoven web.

Thus, the present inventive fibrous nonwoven web is particularly useful in the filtration of fluids to remove bacteria and reduce, if not totally remove, many viruses therefrom, depending upon the particular application and the configuration of the present inventive fibrous nonwoven web. The present inventive fibrous nonwoven web can be used to filter any such fluids, such as pharmacological and biotechnology process fluids. The excellent removal and handling characteristics of the present inventive fibrous nonwoven web, as compared to many other fibrous nonwoven web and membrane filtration media, also render the present inventive fibrous nonwoven web suitable for a variety of other filtration applications, including most applications in which less effective fibrous nonwoven webs currently are being used, as well as in many applications in which membranes are being used and have been considered for use. Exemplary uses of the present inventive fibrous nonwoven web include such applications as a prefilter coalescer for fuel (particularly aircraft fuel, e.g., JP100 fuel), a filter to remove colloidal level iron oxide (which would rapidly plug an equivalent pore rated membrane), and a filter pad for filter presses.

The present inventive fibrous nonwoven web also is useful in a wide variety of other applications. For example, the present inventive fibrous nonwoven web can be utilized in "breathable" protective garments, especially when treated with a fluoropolymer, e.g., polytetrafluoroethylene, repellent or other suitable coating. Examples of other suitable coatings include silicones, waxes, fluorinated ethylene propylene, hydrocarbons, and combinations of the foregoing. In a preferred embodiment, the coating is a combination of fluoropolymers selected to render the web oleophobic and hydrophobic. Preferably, the coating comprises a hydrophobic polyolefin in combination with an oleophobic fluoropolymer. Examples of suitable hydrophobic polyolefins include compounds such as PTFE, FEP, copolymerized ethylene and chlorotrifluoroethylene (ECTFE), polyvinylidene fluoride (PVDF), copolymerized ethylene and tetrafluoroethylene (ETFE), perfluoroalkoxylated polytetrafluoroethylene (PFA PTFE), and polychlorotrifluoroethylene (PCTFE). Examples of suitable oleophobic fluoropolymers include fluoroaliphatic esters, such as FC824 (available from 3M), fluoroalkyl polymers such as FX824 (available from 3M), and release agents such as Milease F53 and F31X (available from ICI).

A garment in accordance with the present invention comprises a fibrous nonwoven web adapted for human apparel. For example, the garment may be a liner for a laboratory smock. Garments prepared in accordance with the present invention are suitable for use in adverse environments such as biological and toxic atmospheres. Moreover, since aramids are flame/heat-resistant and radiation tolerant, with some chemical resistance, the present inventive fibrous nonwoven web, at least when prepared from aramid fibers, can be used in high temperature and/or radiation environments. At very high temperatures, such as temperatures typically employed in conventional incinerators, the webs of the invention may be fully or nearly fully incinerable; that is, they will leave no or very little ash upon incineration, thereby allowing for the efficient disposal of such a garment. Preferably, such a fully incinerable garment in accordance with the present invention does not contain fibers in addition to the aramid fibers which are not fully or nearly fully incinerable, e.g., glass fibers.

In one embodiment, the garment of the invention comprises a composite material. The composite material includes a membrane, such as a PTFE membrane, laminated to the present inventive fibrous web. In a preferred embodiment, the membrane is a fluid-impermeable, gas-permeable PTFE membrane that includes a white pigment, for example, $TiO_2$. Preferably, the pigment has been incorporated into the membrane, for example, during casting of the membrane. The PTFE membrane provides protection in harsh chemical environments, and the white color assists in providing maximum thermal protection.

The fibrous nonwoven web of the present invention can be formed into any suitable configuration. The present inventive polymeric fibrous nonwoven web can be used in suitable filters, filtration cartridges, and the like. The present inventive fibrous nonwoven web can be used in dead-end filtration applications, as well as in tangential, cross-flow, and dynamic filtration applications.

The present inventive fibrous nonwoven web is expected to be especially useful in filter elements, such as filter cartridges, which are generally described in U.S. Pat. No. 4,340,479. Preferred filter elements utilizing the present inventive fibrous nonwoven web comprise the present inventive fibrous nonwoven web, wherein the sides of the fibrous nonwoven web have been overlapped and sealed to form a tubular configuration having an exterior surface, an interior, and two ends, and end caps sealed to the ends of the tube, wherein at least one of the end caps has a central aperture providing access to the interior of the tube, and all of the seals are fluid-tight. The present inventive fibrous nonwoven web preferably is corrugated or pleated in such a filter element so as to provide a large surface area for the volume of the filter element. At least one of the sides of the fibrous nonwoven web can be mated to a porous support layer, and, in such a situation, both the fibrous nonwoven web and porous support layer generally will be corrugated. The filter element can comprise a single fibrous nonwoven web of the present invention or, more preferably, multiple such fibrous nonwoven webs mated together. When there are multiple fibrous nonwoven webs in the filter element, the fibrous nonwoven webs can be separated by a porous support layer to which each fibrous nonwoven web is mated, or, when there are two fibrous nonwoven webs, the fibrous nonwoven webs can be positioned such that there is no porous support layer therebetween. The other aspects of the filter element may be of any suitable construction and prepared from any suitable material. For example, the end caps can be prepared from a suitable thermoplastic material, such as polyolefin, polyamide, and polyester, particularly, polybutylene glycol terephthalate or polyethylene glycol terephthalate. The filter element can be constructed using techniques which are well-known in the art.

The present inventive fibrous nonwoven web is expected to be also useful in helically wrapped filter elements, such as filter septa. Such filter elements are generally described in U.S. Pat. No. 5,290,446. Helically wrapped filter elements in accordance with the present invention will typically comprise the present inventive fibrous nonwoven web which is helically wrapped around a pervious, hollow tube to form an overlap of 0% to about 95% of the width of the fibrous nonwoven web. There may be one or more such helically wrapped fibrous nonwoven webs, and there is preferably at least one diffusion layer which allows for lateral flow of fluid within the filter element positioned between the fibrous nonwoven web and the pervious, hollow tube and/or between successive fibrous nonwoven webs.

In accordance with one embodiment of the present invention, the present inventive fibrous nonwoven web can be calendared to reduce the thickness and pore rating of the web and to impart the web with a smoother and more uniform surface. Calendaring is useful to reduce the thickness of the web and to improve the thickness uniformity of the web. Calendaring, however, can adversely affect the strength characteristics of the web, and, thus, care should be exercised in calendaring the web so as not to adversely affect the strength of the web to such an extent that the web will not have sufficient strength to withstand its intended filtering operation. In addition, the material should not be calendared so as to render the filter nonporous, or so as to adversely affect the pressure drop across the web to a significant extent, as measured by, for example, the Gurley air flow across the web. Preferably, the pressure drop across the material will be no more than 10 times as great after calendaring as before calendaring. More preferably, the increase in pressure drop will be no more than about 5 to about 7 times as great after calendaring as before calendaring.

The calendaring of the support layer can be carried out using any suitable process. The calendaring process preferably is performed in accordance with the method disclosed in U.S. Pat. No. 5,435,957. In this method, the nonwoven material is calendared between a resilient roll and a nondeformable roll. The nondeformable roll comprises or is manufactured from any material that will not deform upon contact with the nonwoven material, for example, stainless steel. The resilient roll comprises or is covered with a coating of plastic, rubber, or fibrous material, such as silicone rubber, urethane, nylon, or cotton. Preferably, the roll has a combined fiber and thermosetting resin covering, such as one of the Beloit Supertex™ materials. A thorough explanation of these process variables and their effect on the calendaring process may be found in the aforementioned U.S. Pat. No. 5,435,957.

The following examples further illustrate the present invention and, of course, should not be construed as in any way limiting its scope.

EXAMPLE 1

This example illustrates the fine pore structure in combination with a relatively low air flow resistance which can be a characteristic of the fibrous nonwoven web of the present invention.

A series of fibrous nonwoven webs was prepared by conventional fibrous sheet techniques from an aqueous slurry of 25 g/l aramid fiber which was subjected to mechanical fibrillation for various times up to about 145 hr using a mill mixer in an open tank system with a 6 inch (about 15 cm) diameter rotor having angular slots against a similarly slotted stator with 0.005–0.008 inch (about 127–203 $\mu$m) clearance. While not intending to bound to any particular theory, it is believed that the aramid fiber slurry concentration was such that the rotor-stator clearance effectively simulated zero or a negative clearance.

Figure 1:
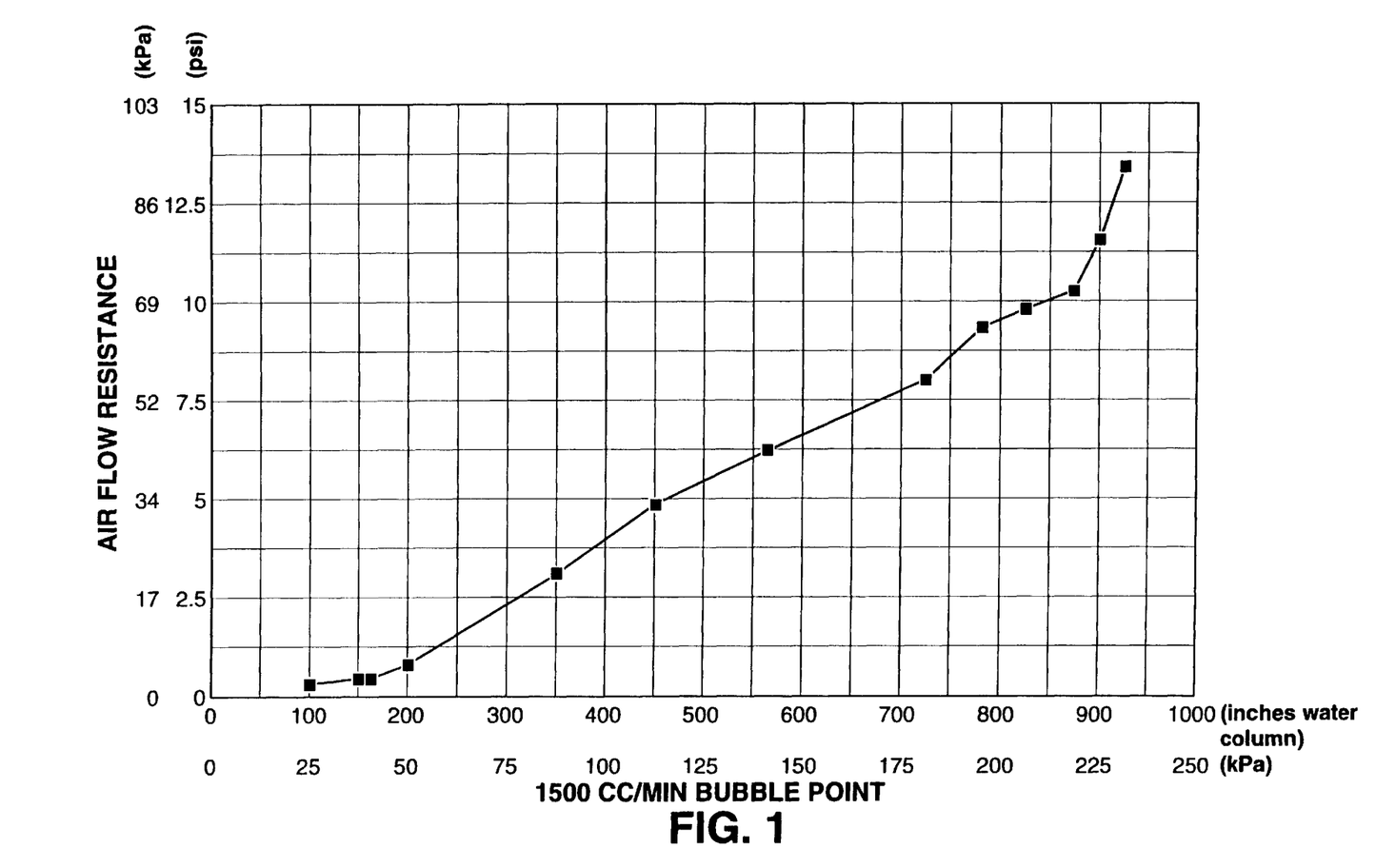
FIG. 1 is a graph depicting a curve showing the relationship between the air flow resistance (psi and kPa) of fibrous nonwoven webs prepared in accordance with Example 1 and the 1500 cc/min bubble points (inch water column and kPa) of the fibrous nonwoven webs.

The resulting fibrous nonwoven webs had thicknesses of about 0.01 inch (about 254 $\mu$m). The air flow resistance at 28 ft/min (about 8.5 m/min) and 1500 cc/min bubble point (ASTM F316-86) was determined for each of the fibrous nonwoven webs. The 1500 cc/min bubble point is the applied pressure resulting in the passage of 1500 cc/min of air through the sheet which is alcohol wet (specifically with isopropyl alcohol), i.e., general air flow through the sheet indicating the expulsion of substantially all the alcohol wetting liquid from the pores of the sheet. The observed air flow resistance and 1500 cc/min bubble point values are set forth in FIG. 1, which is a graph of air flow resistance versus 1500 cc/min bubble point for the fibrous nonwoven webs.

The 1500 cc/min bubble point is an indication of the pore size of the fibrous nonwoven sheet, with the higher bubble points indicative of the smaller pore sizes achievable with increasing processing time of the aramid fiber in the mill mixer. As is apparent from the graph of FIG. 1, the present inventive fibrous nonwoven web can be characterized by a relatively high 1500 cc/min bubble point, e.g., about 800 inches water column (about 200 kPa) or more, with a reasonable air flow resistance, e.g., about 10–15 psi (about 69–103 kPa).

EXAMPLE 2

This example illustrates the excellent titer reduction with respect to viruses of a fibrous nonwoven web of the present invention.

A fibrous nonwoven web was prepared in the manner described in Example 1. The fibrous nonwoven web had a thickness of about 0.01 inch (about 254 μm) and possessed an air flow resistance at 28 ft/min (about 8.5 m/min) of about 12 psi (about 83 kPa) and a 1500 cc/min bubble point (ASTM F316-86) of about 900 inches water column (about 225 kPa).

Two 142 mm diameter disc samples of the fibrous nonwoven web were subjected to a challenge fluid comprising 0.2 μm filtered Tryptin soy broth containing $1.6 \times 10^8$/ml PR772 coliphage. The challenge was run via a pressure vessel at 100–200 ml/min, with a total of 500 ml effluent being collected for each test disc. The effluent then was tested to determine the titer reduction achieved by each disc.

The two disc samples were found to have titer reductions with respect to PR772 coliphage of $4.6 \times 10^3$ and $5.0 \times 10^3$, respectively.

EXAMPLE 3

This example further illustrates the excellent titer reduction with respect to viruses of a fibrous nonwoven web of the present invention.

The fibrous nonwoven web of Example 2 was subjected to the same viral titer reduction testing set forth in Example 2, except that the challenge fluid contained $1.5 \times 10^8$/ml PR772 coliphage and two layers of the fibrous nonwoven web were used in each of two tests. Thus, the thickness of the tested disc samples was about 0.020 inch (about 508 μm), with a total air flow resistance at 28 ft/min (about 8.5 m/min) of about 24 psi (about 166 kPa).

Each of the two disc samples were found to have titer reductions with respect to PR772 coliphage of $>1.5 \times 10^8$. Thus, the present inventive fibrous nonwoven web removed all of the PR772 coliphage from the challenge fluid.

EXAMPLE 4

This example illustrates the effect of incorporating a binder into the present inventive fibrous nonwoven web.

A series of aramid fiber webs was prepared in accordance with the method set forth in Example 1. The fibers were subjected to mechanical fibrillation for approximately 16 hours using a mill mixer in an open tank system with a 6 inch (about 15 cm) diameter rotor having angular slots against a similarly slotted stator with 0.005–0.008 inch (about 127–203 μm) clearance. The first web was prepared without a binder. The second web was prepared by passing the aramid fiber web through a solution of an epoxy binder, then drying and curing the web. Further webs were similarly prepared using other binders.

The tensile strength of each web was evaluated by gripping a 1-inch (2.54 cm) sample between two jaws, then separating the jaws at a rate of 15 inches (38.1 cm) per minute until the web ruptured. The force at rupture was then evaluated. The tensile strength of each fibrous web was as follows:

| Example | Binder | Tensile Strength lb/in² (kPa) |
| --- | --- | --- |
| 4A | None | 1.6 (11.0) |
| 4B | Epoxy | 8.2 (56.5) |
| 4C | Phenolic | 5.3 (36.5) |
| 4D | EVA | 7.2 (49.6) |
| 4E | KYMENE | 10.9 (75.2) |
| 4F | FEP | 4 (27.6) |

It is thus seen that the binders increased the strength of the fibrous nonwoven web of the present invention.

EXAMPLE 5

This example illustrates the properties of cellulose-aramid fiber composite webs of the present invention.

Two nonwoven composite fibrous webs were prepared in accordance with the present invention. The webs were prepared from an aqueous slurry of aramid and cellulose fibrous webs, in a manner similar to that set forth in Example 1. The webs had the following compositions:

| Example | Aramid fibers | Cellulose fibers |
| --- | --- | --- |
| 5A | 50% | 50% |
| 5B | 25% | 75% |

The web of Example 5A had a thickness of about 0.012 inch (about 304.8 μm), and that of Example 5B had a thickness of about 0.027 inch (685.8 μm). The air flow resistance at 28 ft/min (about 8.5 m/min) and 1500 cc/min bubble point (ASTM F316-86) for each of the fibrous nonwoven webs were as follows:

| Example | Bubble point inch H₂O (kPa) | Pressure drop psi (kPa) |
| --- | --- | --- |
| 5A | 450 (112) | 9 (65) |
| 5B | 100 (25) | 5 (34) |

The webs of this example are useful as filter press pads for filtering yeast from beverage syrups, for example, to obtain a beverage syrup having a reduced yeast level.

EXAMPLE 6

This example further illustrates the preparation of aramid fiber webs having fine fiber diameters in accordance with the present invention.

Figure 2:
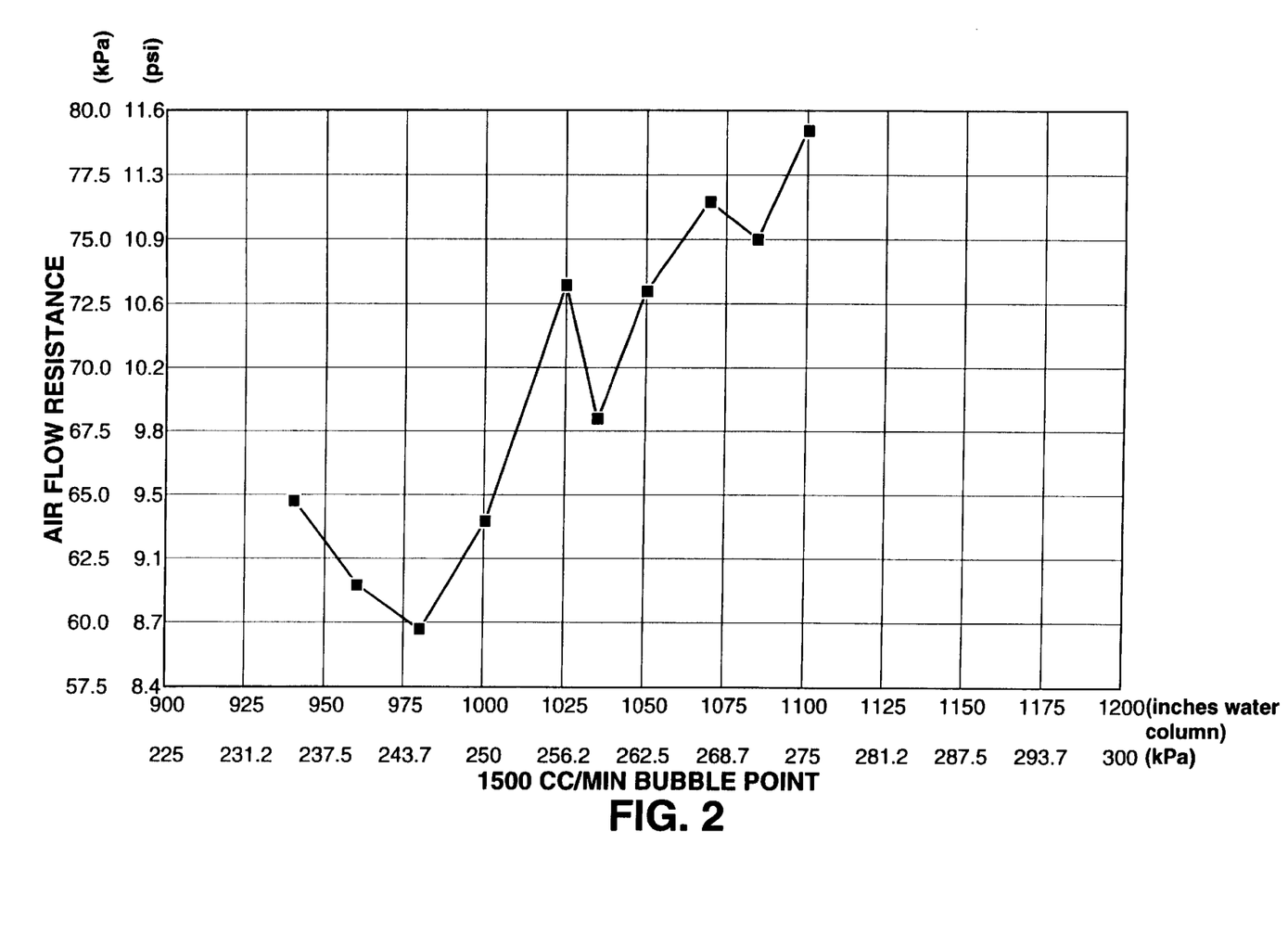
FIG. 2 is a graph depicting a curve showing the relationship between the air flow resistance (psi and kPa) of fibrous nonwoven webs prepared in accordance with Example 6 and the 1500 cc/min bubble points (inch water column and kPa) of the fibrous nonwoven webs.

Nonwoven aramid fibrous webs were prepared in accordance with the method of Example 1. The webs had a nominal thickness ranging from about 0.004 inch to 0.006 inch (102 μm to 152 μm), and a basis weight of about 32–43 g/m². The air flow resistance at 28 ft/min (about 8.5 m/min) and 1500 cc/min bubble point (ASTM F316-86) were determined for each of the fibrous nonwoven webs. The observed air flow resistance and 1500 cc/min bubble point values are set forth in FIG. 2, which is a graph of air flow resistance versus bubble point values, as graphed for various webs. When the bubble point value exceeds about 900 inch water column (about 225 kPa), the pore rating of the web is less than about 0.05 μm, thus indicating that the web provides a barrier to pesticides, viruses, and bacteria.

All of the references cited herein, including publications, patents, and patent applications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A fibrous nonwoven web characterized by having a titer reduction of at least about $10^1$ with respect to PR772 coliphage and an air flow resistance of about 30 psi or less at a thickness of about 0.01 inch or less, wherein said web comprises cellulose fibers.

2. The fibrous nonwoven web of claim 1, wherein said web further comprises other fibers selected from the group consisting of polyester fibers, polytetrafluoroethylene fibers, cotton fibers, and glass fibers.

3. The fibrous nonwoven web of claim 1 having a titer reduction of at least about $10^8$ with respect to PR772 coliphage at a thickness of about 0.01 inch or less.

4. The fibrous nonwoven web of claim 1, wherein said fibrous nonwoven web has a surface coating of a polymer thereon.

5. The fibrous nonwoven web of claim 1, wherein said fibrous nonwoven web includes a binder resin.

6. A composite structure comprising the fibrous nonwoven web of claim 1 laminated to a polymeric membrane on at least one surface of said fibrous nonwoven web.

7. A filter element comprising a housing and the fibrous nonwoven web of claim 1.

8. A garment comprising the fibrous nonwoven web of claim 1 adapted for human apparel.

9. A fibrous nonwoven web characterized by having a titer reduction of at least about $10^1$ with respect to PR772 coliphage and an air flow resistance of about 30 psi or less at a thickness of about 0.01 inch or less, wherein said web comprises aramid fibers and non-aramid fibers.

10. The fibrous nonwoven web of claim 9, wherein said non-aramid fibers are selected from the group consisting of polyester fibers, polytetrafluoroethylene fibers, cotton fibers, glass fibers, and cellulose fibers.

11. The fibrous nonwoven web of claim 9 having a titer reduction of at least about $10^8$ with respect to PR772 coliphage at a thickness of about 0.01 inch or less.

12. The fibrous nonwoven web of claim 9, wherein said fibrous nonwoven web has a surface coating of a polymer thereon.

13. The fibrous nonwoven web of claim 9, wherein said fibrous nonwoven web includes a binder resin.

14. A composite structure comprising the fibrous nonwoven web of claim 9 laminated to a polymeric membrane on at least one surface of said fibrous nonwoven web.

15. A filter element comprising a housing and the fibrous nonwoven web of claim 9.

16. A garment comprising the fibrous nonwoven web of claim 9 adapted for human apparel.

17. A fibrous nonwoven web characterized by having a titer reduction of at least about $10^5$ with respect to PR772 coliphage and an air flow resistance of about 30 psi or less at a thickness of about 0.02 inch or less, wherein said web comprises cellulose fibers.

18. The fibrous nonwoven web of claim 17, wherein said web further comprises other fibers selected from the group consisting of polyester fibers, polytetrafluoroethylene fibers, cotton fibers, and glass fibers.

19. The fibrous nonwoven web of claim 17 having a titer reduction of at least about $10^8$ with respect to PR772 coliphage at a thickness of about 0.02 inch or less.

20. The fibrous nonwoven web of claim 17, wherein said fibrous nonwoven web has a surface coating of a polymer thereon.

21. The fibrous nonwoven web of claim 17, wherein said fibrous nonwoven web includes a binder resin.

22. A composite structure comprising the fibrous nonwoven web of claim 17 laminated to a polymeric membrane on at least one surface of said fibrous nonwoven web.

23. A filter element comprising a housing and the fibrous nonwoven web of claim 17.

24. A garment comprising the fibrous nonwoven web of claim 17 adapted for human apparel.

25. A fibrous nonwoven web characterized by having a titer reduction of at least about $10^5$ with respect to PR772 coliphage and an air flow resistance of about 30 psi or less at a thickness of about 0.02 inch or less, wherein said web comprises aramid fibers and non-aramid fibers.

26. The fibrous nonwoven web of claim 25, wherein said non-aramid fibers are selected from the group consisting of polyester fibers, polytetrafluoroethylene fibers, cotton fibers, glass fibers, and cellulose fibers.

27. The fibrous nonwoven web of claim 25 having a titer reduction of at least about $10^8$ with respect to PR772 coliphage at a thickness of about 0.02 inch or less.

28. The fibrous nonwoven web of claim 25, wherein said fibrous nonwoven web has a surface coating of a polymer thereon.

29. The fibrous nonwoven web of claim 25, wherein said fibrous nonwoven web includes a binder resin.

30. A composite structure comprising the fibrous nonwoven web of claim 25 laminated to a polymeric membrane on at least one surface of said fibrous nonwoven web.

31. A filter element comprising a housing and the fibrous nonwoven web of claim 25.

32. A garment comprising the fibrous nonwoven web of claim 25 adapted for human apparel.

* * * * *